(12) United States Patent
Chen (10) Patent No.: US 9,115,936 B2
(45) Date of Patent: Aug. 25, 2015

(54) COOLING APPARATUS AND METHOD USING A VACUUM PUMP

(75) Inventor: Han Ying Chen, Zhubei (TW)

(73) Assignee: Wave Power Technology, Inc. (TW)

( * ) Notice: Subject to any disclaimer, the term of this patent is extended or adjusted under 35 U.S.C. 154(b) by 212 days.

(21) Appl. No.: 13/396,803

(22) Filed: Feb. 15, 2012

(65) Prior Publication Data

US 2013/0206357 A1  Aug. 15, 2013

(51) Int. Cl.
*F25B 19/00* (2006.01)
*F28D 20/00* (2006.01)
*F28F 27/00* (2006.01)
*F28F 13/00* (2006.01)
*F28D 7/02* (2006.01)
*F28D 20/02* (2006.01)

(52) U.S. Cl.
CPC ............ *F28D 20/0034* (2013.01); *F28D 7/024* (2013.01); *F28F 13/00* (2013.01); *F28F 27/00* (2013.01); *F28D 20/028* (2013.01); *F28F 2013/001* (2013.01); *Y02E 60/142* (2013.01)

(58) Field of Classification Search
CPC ..... F28D 15/00; F28D 20/0034; F28D 7/024; F28D 20/028; F28F 27/00; F28F 13/00; F28F 2013/001; Y02E 60/142
USPC ........ 62/100, 268, 270, 451, 452, 457.9, 440, 62/264, 376
See application file for complete search history.

(56) References Cited

U.S. PATENT DOCUMENTS

| | | | | |
|---|---|---|---|---|
| 2,996,898 | A | * | 8/1961 | Hosken et al. .................. 62/268 |
| 4,055,053 | A | * | 10/1977 | Elfving et al. .................. 62/3.63 |
| 4,958,506 | A | * | 9/1990 | Guilhem et al. ............. 62/457.2 |
| 5,520,004 | A | * | 5/1996 | Jones, III .......................... 62/63 |
| 5,701,746 | A | * | 12/1997 | Desgrandchamps et al. ..... 62/62 |
| 5,878,190 | A | * | 3/1999 | Gloyd et al. .................. 392/403 |
| 5,928,699 | A | * | 7/1999 | Reznik .......................... 426/524 |
| 8,097,449 | B2 | * | 1/2012 | Garland et al. ............ 435/284.1 |
| 2008/0302121 | A1 | | 12/2008 | Lindauer |
| 2011/0162959 | A1 | * | 7/2011 | Okada et al. ............... 204/192.1 |

* cited by examiner

*Primary Examiner* — Cheryl J Tyler
*Assistant Examiner* — Ana Vazquez
(74) *Attorney, Agent, or Firm* — David I. Roche; Baker & McKenzie LLP (57) ABSTRACT

A cooling apparatus includes a shell adapted to hermetically store liquid water, a heat exchanging structure adapted to receive a substance to cool down, and a vacuum pump. The heat exchanging structure has one or more heat transfer walls, each of the heat transfer walls having a first surface in contact with the liquid water stored in the shell, and a second surface in contact with the substance to cool down. The vacuum pump is operable to create a partial vacuum on a surface of the liquid water, whereby causing a decrease in a temperature of the liquid water in the shell. In other embodiments, methods of cooling a substance are also described.

17 Claims, 7 Drawing Sheets

COOLING APPARATUS AND METHOD USING A VACUUM PUMP

BACKGROUND

1. Field of the Invention

The present invention relates to cooling apparatuses.

2. Description of the Related Art

Cold insulated containers may be used to keep cold various items, such as fresh food, beverage and the like. The cold insulated container usually has a thermally-insulated shell in which ice can be placed to cool down the items placed in the shell. However, as the container is used over a period of time, the ice eventually melts down. As a result, the cooling effect may be limited in time.

Another type of cooling containers may use a cooling semiconductor chip. Electric current may be supplied to the cooling semiconductor chip which can carry heat from one side of the chip (corresponding to an inside of the container) to another side (corresponding to the outside of the container). As a result, the interior of the container can be kept at a low temperature. However, because the cooling semiconductor chip is expensive to produce, this type of cooling containers is not cost-effective.

Therefore, there is a need for a cooling apparatus that can be manufactured in a cost-effective way, and address at least the foregoing issues.

SUMMARY

The present application describes a cooling apparatus and method. In one embodiment, the cooling apparatus includes a shell adapted to hermetically store liquid water, a heat exchanging structure adapted to receive a substance to cool down, and a vacuum pump. The heat exchanging structure has one or more heat transfer walls, each of the heat transfer walls having a first surface in contact with the liquid water stored in the shell, and a second surface in contact with the substance to cool down. The vacuum pump is operable to create a partial vacuum on a surface of the liquid water, whereby causing a decrease in a temperature of the liquid water in the shell.

In other embodiments, a method of cooling a substance is described. In some embodiments, the method includes confining liquid water in a shell, so that the liquid water is in contact with a heat exchanging structure, creating partial vacuum on a surface of the liquid water, thereby causing a temperature of the liquid water to decrease, and placing a substance to cool down in the heat exchanging structure.

DETAILED DESCRIPTION OF THE EMBODIMENTS

The present application describes a cooling apparatus and a method thereof. The cooling apparatus includes a shell made of a rigid material, a heat exchanging structure and a vacuum pump. The shell is adapted to hermetically confine an amount of liquid water. The heat exchanging structure is adapted to receive a substance to cool down. The heat exchanging structure includes one or more heat transfer walls. Each of the heat transfer walls has a first surface that can contact with the water stored in the shell, and a second surface that can contact with the substance to cool down. The vacuum pump operable to create a partial vacuum above a surface of the liquid water stored in the shell. As the pressure acting on the surface of the liquid water abrupt decreases, the rate of evaporation of the liquid water can be increased without supplying energy. Accordingly, latent heat of vaporization is taken in, and the temperature of the liquid water can decrease to produce a cooling action.

Figure 1:
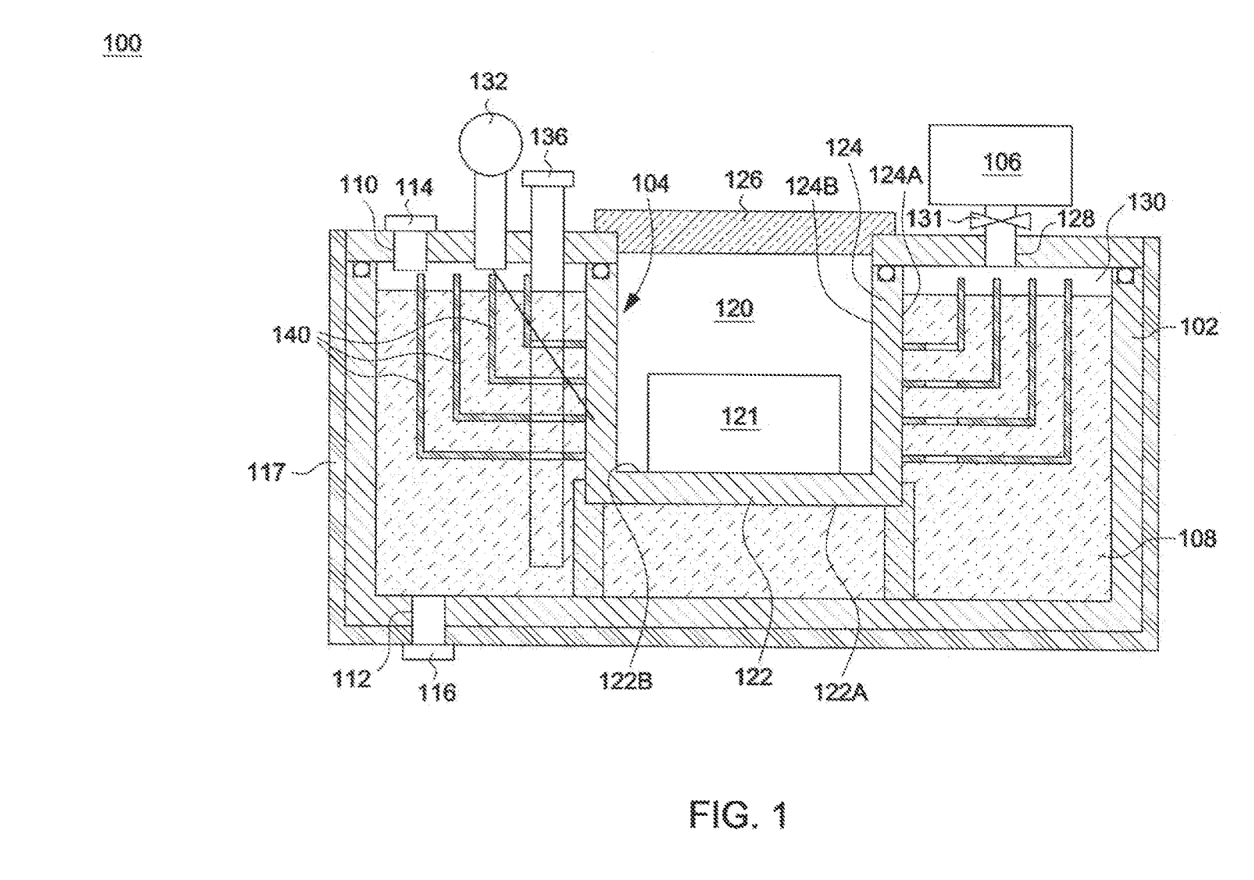
FIG. 1 is a schematic view illustrating an embodiment of a cooling apparatus.

FIG. 1 is a schematic view illustrating a cooling apparatus 100. The cooling apparatus 100 can include a shell 102, a heat exchanging structure 104 and a vacuum pump 106. The shell 102 can be made of a rigid material, and has an interior in which liquid water 108 can be hermetically confined at rest. The shell 102 can include a water inlet 110 and a water outlet 112. The water inlet 110 can be provided at an upper side of the shell 102, whereas the water outlet 112 can be provided at a bottom of the shell 102. Liquid water can be supplied into the shell 102 via the water inlet 110, and the liquid water 108 stored in the shell 102 can be exhausted via the water outlet 112. Sealing members 114 and 116 can be provided to hermetically close and open the water inlet 110 and the water outlet 112, respectively. In addition, the shell 102 can have an outer sidewall at least partially covered with a heat insulating material 117.

Figure 2:
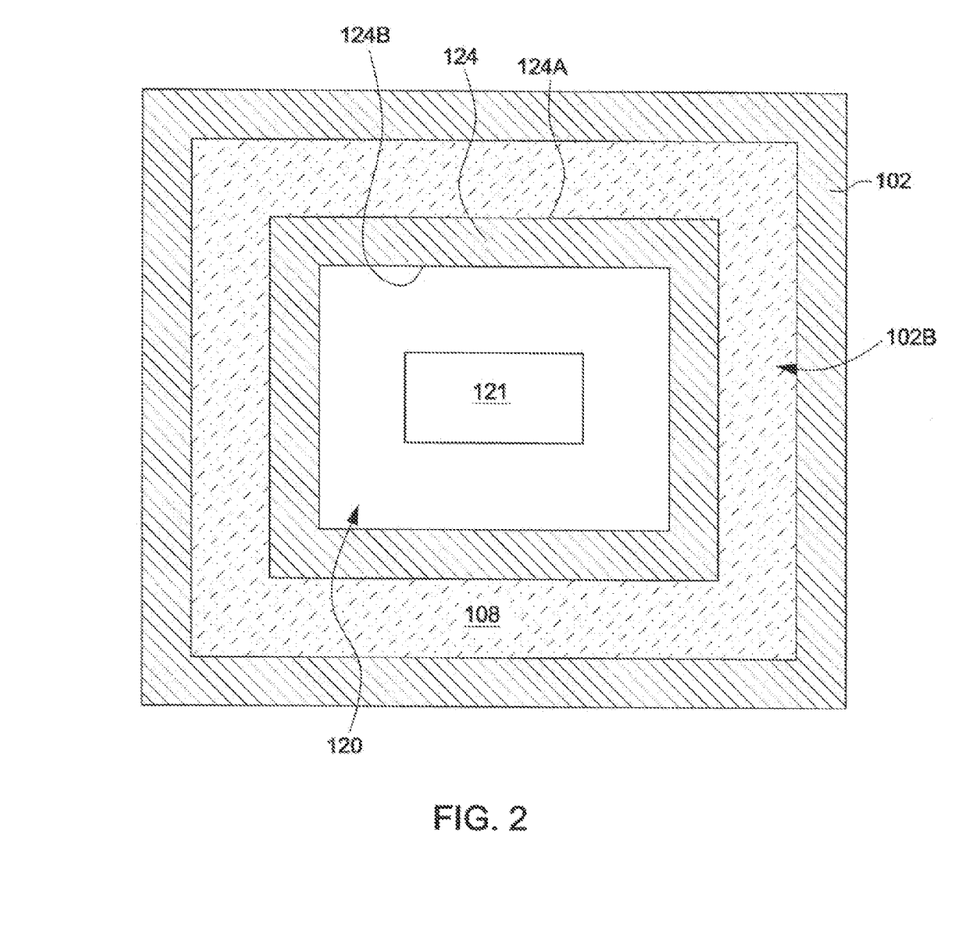
FIG. 2 is a schematic top view illustrating the construction of a heat exchanging structure in the cooling apparatus.

In conjunction with FIG. 1, FIG. 2 is a schematic top view illustrating the construction of the heat exchanging structure 104. The heat exchanging structure 104 can be made of a material having good heat conducting properties, including metallic materials such as aluminum alloy. In one embodiment, the heat exchanging structure 104 can be a chamber 120 that is formed at least partially as a recessed pocket in walls of the shell 102. The chamber 120 can be accessible from an outside of the cooling apparatus 100 for placement of a substance 121 to cool down. The substance 121 can include liquid beverage, food, or any articles that need cooling.

The chamber 120 can be located at a central area of the shell 102. The shell 102 can have a first water storage region 102A located underneath the chamber 120, and second water storage regions 102B located adjacent to one or more sides of the chamber 120. As shown in FIG. 2, the second water storage regions 102B can substantially surround the chamber 120 to increase the cooling action that is produced by the liquid water 108 and transferred to the interior of the chamber 120.

The heat exchanging structure 104 can have one or more heat transfer walls, such as a bottom floor 122 of the chamber 120, and lateral sidewalls 124 extending upward from the bottom floor 122. Each of the heat transfer walls can have a first surface (e.g., the surface 122A for the bottom floor 122, and the surfaces 124A for the lateral sidewalls 124) that can contact with the liquid water 108 stored in the shell 102, and a second surface (e.g., the surface 122B for the bottom floor 122, and the surfaces 124B for the lateral sidewalls 124) that can contact with the substance 121 to cool down. Cooling action be transmitted from the liquid water 108 through the bottom floor 122 and the lateral sidewalls 124 of the chamber 120 to the substance 121.

An upper side of the chamber 120 can be provided with a lid 126 operable to close and open the chamber 120. When the lid 126 is opened, the interior of the chamber 120 can be exposed outward for placement of the substance 121.

The vacuum pump 106 can be connected with the shell 102 via a coupling port 128 provided at an upper side of the shell 102. In one embodiment, the vacuum pump 106 can be permanently assembled with the shell 102. In alternate embodiments, the vacuum pump 106 can be removably connected with the shell 102. While the shell 102 stores liquid water 108, the vacuum pump 106 can be operable to draw gas molecules outside a sealed gap 130 located above the liquid water 108 to create a partial vacuum above the water surface. The vacuum pump 106 may include a pressure sensor (not shown) adapted to detect the pressure in the gap 130, such that the operation (e.g., activation and deactivation) of the vacuum pump 106 can be controlled according to the pressure in the sealed gap 130. For example, the vacuum pump 106 may stop operating when the sensed pressure above the liquid water 108 reaches a predetermined pressure value.

Moreover, the vacuum pump 106 may also include a venting valve 131. The venting valve 131 may be operable to release a partial vacuum created in the gap 130 for facilitating opening of the water inlet 110.

Referring again to FIG. 1, the cooling apparatus 100 can also include a temperature sensor 132 and a liquid level sensor 136. The temperature sensor 132 can be electrically connected with the vacuum pump 106.

The temperature sensor 132 can be operable to measure a temperature inside the shell 102, e.g., the temperature of the liquid water 108 stored in the shell 102, or the temperature of the surfaces 124A of the heat exchanging structure 104. Sensor signals issued from the temperature sensor 132 can be used to control the vacuum pump 106. For example, the vacuum pump 106 can be activated when the temperature read by the temperature sensor 132 rises and reaches a predetermined high threshold value insufficient to provide desirable cooling action.

The liquid level sensor 136 can be operable to measure a height of the water 108 stored in the shell 102. Signals issued from the liquid level sensor 136 can be used to control the amount of liquid water 108 confined in the shell 102. For example, when the liquid level sensor 136 detects that the liquid water 108 decreases and reaches a predetermined first level, an alert message or signal can be outputted for indicating that supply of water is needed. The first level may correspond to a low level of liquid water that is insufficient to provide proper cooling action, and/or to a level that is so low that the heat exchanging structure 104 is substantially out of contact with the liquid water 108 and is exposed above the water surface.

Moreover, a second alert message or signal can also be outputted when the liquid level sensor 136 detects that the liquid water 108 supplied to the shell 102 has reached a predetermined second level higher than the first level. The second level may be a high level at which the heat exchanging structure 104 is substantially in contact with the liquid water 108 (e.g., when the liquid water 108 has reached a certain height of the lateral sidewalls 124). In some embodiments, the second level may also be set to leave a suitable gap 130 above the liquid water 108 for allowing operation of the vacuum pump 106.

Figure 3:
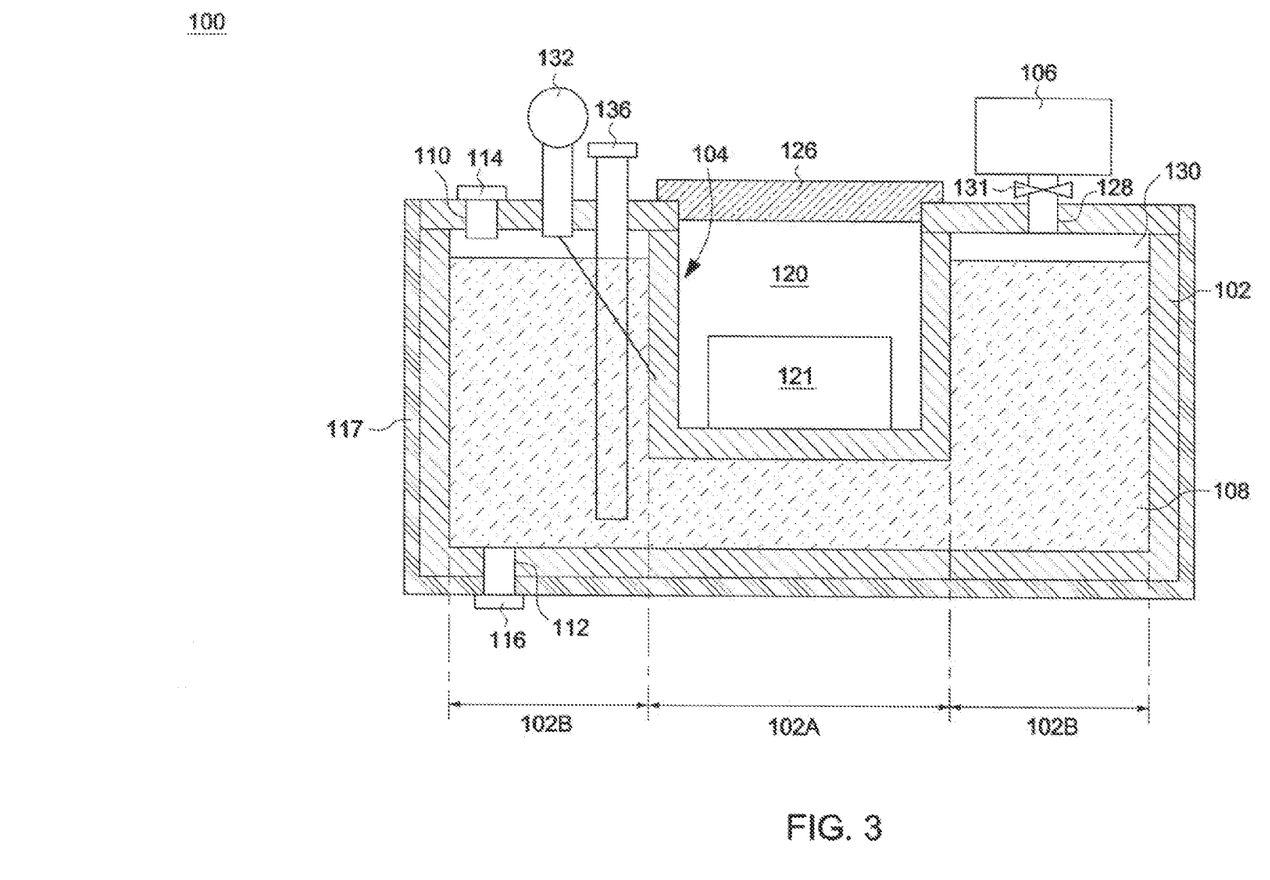
FIG. 3 is a schematic view illustrating a variant embodiment of the cooling apparatus shown in FIG. 1.

As shown in FIG. 1, the interior of the shell 102 can also include one or more heat conductor fins 140. The heat conductor fins 140 can extend along a depth of the shell 102 so as to be in substantial contact with the liquid water 108. The liquid water 108 cools down progressively from the surface toward deeper regions. The heat conductor fins 140 can facilitate heat transfer to promote cooling of the liquid water 108. It is noted that the heat conductor fins 140 may be optional, and alternate embodiments may also provide a shell 102 without the heat conductor fins 140, as shown in FIG. 3.

Figure 4:
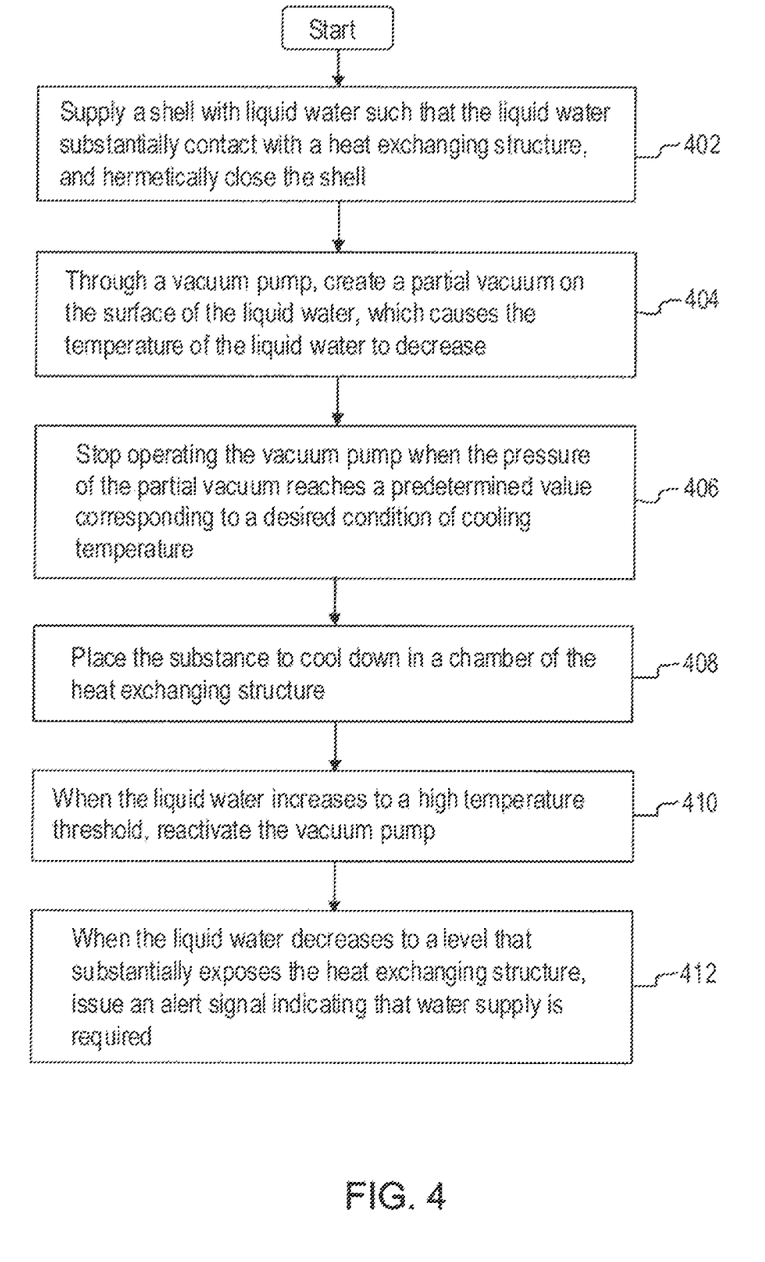
FIG. 4 is a flowchart of method steps of cooling a desired substance with the cooling apparatus shown in FIG. 1.

In conjunction with FIG. 1, FIG. 4 is a flowchart of method steps of cooling the substance 121 with the cooling apparatus 100. In initial step 402, the sealing member 114 can be opened, and the shell 102 can be supplied with liquid water introduced through the water inlet 110. The liquid water 108 can include plain water, salted water, or like water composition easy to obtain. The liquid water 108 contained in the shell 102 should substantially contact with the heat exchanging structure 104. For example, the initial height of the liquid water 108 can be such that it substantially contacts with the surfaces 122A and 124A of the chamber 120. The sealing member 114 then can be used to close the water inlet 110, such that the liquid water 108 is hermetically stored at rest in the shell 102. It is noted that the amount of water introduced in the shell 102 should not exceed the level of the port 128, and a gap 130 of air should be left above the surface of the liquid water 108.

In step 404, a partial vacuum can be created above the water surface by activating the vacuum pump 106 to draw gas molecules (e.g., air at the beginning) outside the sealed gap 130 above the surface of the liquid water 108. As the pressure acting on the water surface abruptly drops, the rate of evaporation of the liquid water 108 can promptly increase. As a result, latent heat of vaporization is taken in, and the temperature of the liquid water 108 can rapidly decrease.

In step 406, once the decreasing pressure in the sealed gap 130 reaches a predetermined low pressure value corresponding to a desired condition of cooling temperature, the vacuum pump 106 can stop operating. In one embodiment, the pressure of the partial vacuum generated by the vacuum pump 106 may be controlled to cause a temperature drop of the liquid water 108 to near a freezing point (e.g., near 0 degrees Celsius for plain water, or lower for salted water). The time for the water 108 to reach the desired cooling temperature can be relatively short, e.g., about 5 minutes. However, the pressure of the partial vacuum may also be variably set for other desirable cooling temperatures. The pressure in the gap 130 at which the vacuum pump 106 can be stopped can be exemplary in the range between about 3 and about 5 torrs.

In step 408, the lid 126 can be opened, and the substance 121 to cool down can be placed in the chamber 120. The lid 126 then can be closed, and the cooling action produced by the chilled liquid water 108 can be applied through the heat exchanging structure 104 onto the substance 121.

It is worth noting that while step 408 is illustrated as being performed after steps 402-406, it will be appreciated that step 408 may be performed in any order, in parallel to or before steps 402-406.

As the cooling apparatus 100 is used over a period of time, the temperature of the liquid water 108 may gradually increase, and a portion of the liquid water 108 may be converted to vapor in the sealed gap 130. When the temperature of the liquid water 108 increases and reaches a certain high temperature threshold, the vacuum pump 106 in step 410 can be reactivated such that the liquid water 108 can undergo a new cooling cycle.

As multiple cooling cycles are successively applied, the liquid water 108 is progressively turned into vapor that is drawn out by the vacuum pump 106. As a result, the amount of liquid water 108 may progressively decrease. When the decreasing liquid water 108 reaches a low level that substantially exposes the exchanging structure 104 above the water surface (e.g., when the liquid water 108 no longer contacts with the bottom floor 122 or the lateral sidewalls 124 of the chamber 120), the liquid level sensor 136 in step 412 can issue an alert signal indicating that supply of water is required. Then the venting valve 131 may be opened to release the partial vacuum in the gap 130, the sealing member 114 can be opened, and water can be introduced via the water inlet 110 into the shell 102.

When the cooling apparatus 100 is unused or need maintenance, the water 108 contained in the shell 102 can be entirely exhausted via the water outlet 112.

The aforementioned embodiments can be implemented as portable or fixed cooling and/or refrigerator apparatuses that can be conveniently used in outdoor or indoor environments. As water is the only medium required, the cooling apparatus can operate at economical cost and does not involve toxic refrigerant, which makes it more environment-friendly.

Figure 5:
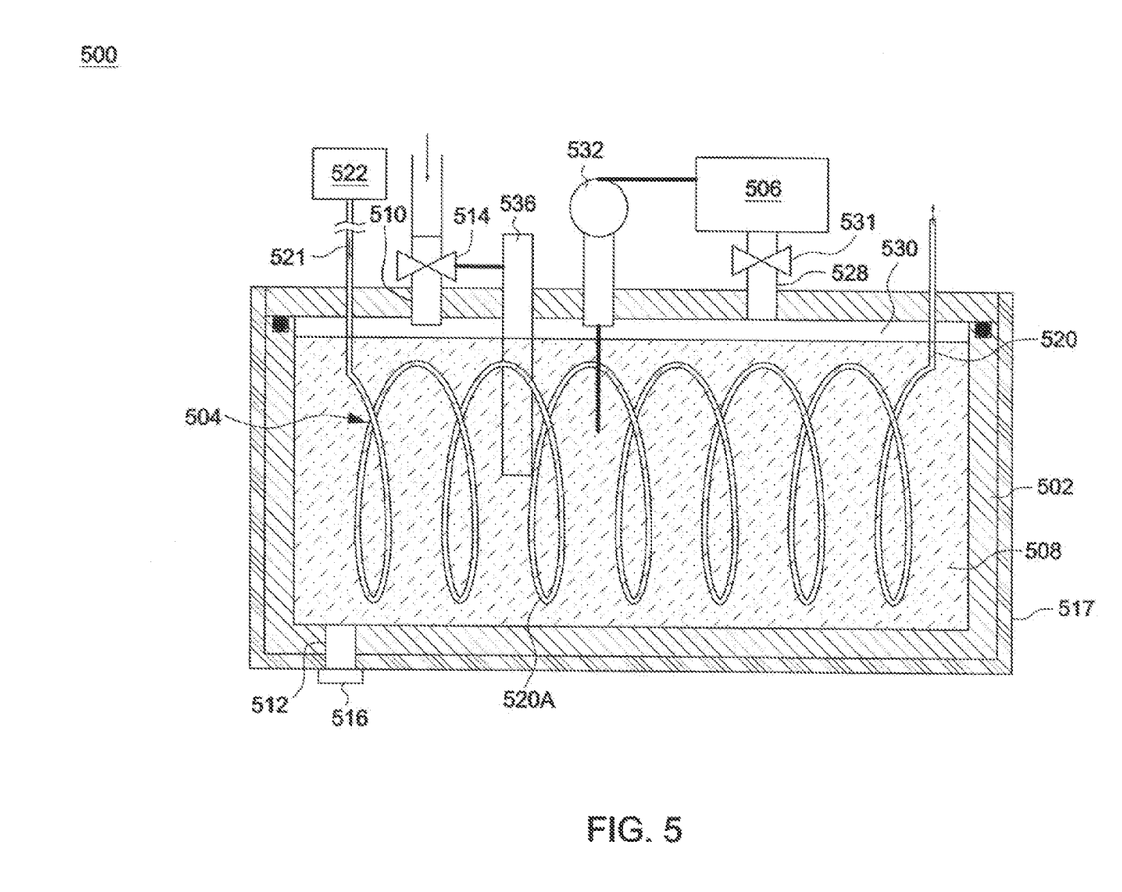
FIG. 5 is a schematic view illustrating another embodiment of a cooling apparatus.

FIG. 5 is a schematic view illustrating another embodiment of a cooling apparatus 500 that applies the same principle described previously. Likewise, the cooling apparatus 500 can include a shell 502, a heat exchanging structure 504 and a vacuum pump 506. The shell 502 can be made of a rigid material, and include a water inlet 510 and a water outlet 512. The water inlet 510 can be provided at an upper side of the shell 502, whereas the water outlet 512 can be provided at a bottom of the shell 502. Liquid water can be supplied into the shell 502 via the water inlet 510, and exhausted via the water outlet 512. In one embodiment, the water inlet 510 can be provided with a valve 514 operable to open and hermetically close the water inlet 510. The water outlet 512 can be hermetically closed by a sealing member 516. In addition, the shell 502 can have an outer sidewall at least partially covered with a heat insulating material 517.

The heat exchanging structure 504 can be formed as a pipe circuit 520 that extends from the interior of the shell 502 to an outside environment. In one embodiment, the pipe circuit 520 can include a coil-shaped portion 520A located in the shell 502. The coil-shaped portion 520A can increase the surface area of contact between the heat exchanging structure 504 and the liquid water 508. During operation, the heat exchanging structure 504 (in particular the coil-shaped portion 520A of the pipe circuit 520) can be substantially immersed in the liquid water 508 confined in the shell 502, and a substance 521 to cool down can be contained and flowed through the interior of the heat exchanging structure 504. Examples of the substance 521 can include fluids such as air gas, liquids, and the like. In one embodiment, the heat exchanging structure 504 can also be connected with a flow pump 522 operable to flow the substance 521 through the heat exchanging structure 504.

Figure 6:
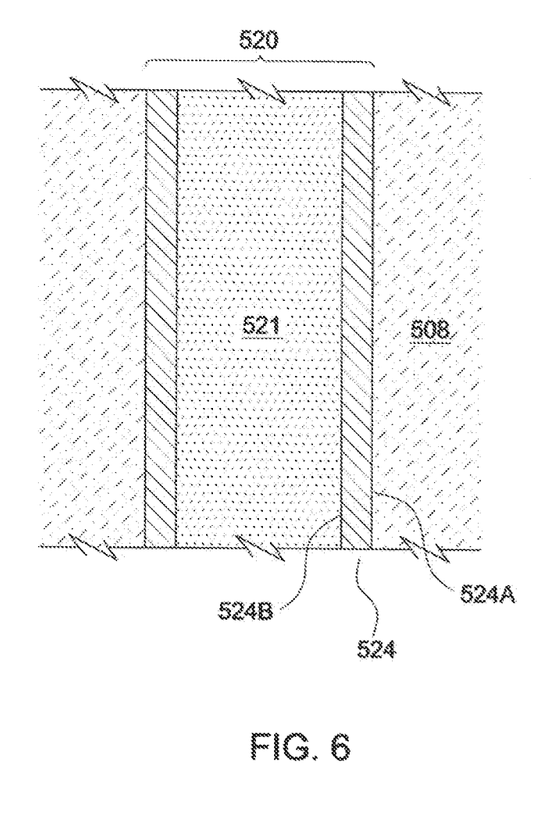
FIG. 6 is a partially enlarged view of a heat exchanging structure used in the cooling apparatus shown in FIG. 5.

FIG. 6 is a partially enlarged view illustrating a section of the pipe circuit 520 in the heat exchanging structure 504. The heat exchanging structure 504 can have one or more heat transfer walls 524. Each of the heat transfer walls 524 can have a first surface 524A that can be in contact with the water 508, and a second surface 524B that can be in contact with the substance 521 contained in the heat exchanging structure 504.

Referring again to FIG. 5, the vacuum pump 506 can be connected with the shell 502 via a coupling port 528 provided at an upper side of the shell 502. While the shell 502 stores liquid water 508, the vacuum pump 506 can be operable to draw gas molecules outside a sealed gap 530 above the liquid water 508 to create a partial vacuum above the water surface.

The vacuum pump 506 may include a pressure sensor (not shown) adapted to detect the pressure in the gap 530, such that the operation (e.g., activation and deactivation) of the vacuum pump 506 can be controlled according to the pressure in the gap 530. For example, the vacuum pump 506 may stop operating when the sensed pressure above the liquid water 508 reaches a predetermined pressure value.

Moreover, the vacuum pump 506 may also include a venting valve 531 operable to release a partial vacuum created in the gap 530.

In addition, the cooling apparatus 500 can also include a temperature sensor 532 and a liquid level sensor 536. The temperature sensor 532 can be electrically connected with the vacuum pump 506, and the liquid level sensor 536 can be electrically connected with the valve 514.

The temperature sensor 532 can be operable to measure a temperature inside the shell 502, e.g., the temperature of the liquid water 508 stored in the shell 502, or the temperature on a wall of the heat exchanging structure 504. Sensor signals issued from the temperature sensor 532 can be used to control the vacuum pump 506. For example, the vacuum pump 506 can be activated when the temperature read by the temperature sensor 532 rises and reaches a predetermined high threshold value insufficient to provide desirable cooling action.

The liquid level sensor 536 can be operable to measure a height of the liquid water 508 stored in the shell 502. Sensor signals issued from the liquid level sensor 536 can be used to control the amount of liquid water 508 in the shell 502. For example, when the liquid level sensor 536 detects that the liquid water 508 decreases and reaches a predetermined first level, a first signal can be outputted for indicating that supply of water is needed. The first level may correspond to a low level of water that is insufficient to provide proper cooling action, and/or to a level that is so low that the heat exchanging structure 504 is out of contact with the liquid water 508 and substantially exposed above the water surface (e.g., when more than one third or more than half of the coil-shaped portion 520A in the shell 502 is exposed above the water surface). In one embodiment, the first signal outputted from the liquid level sensor 536 can be used to electrically control the opening of the valve 514, such that liquid water can be automatically refilled through the water inlet 510 to keep the heat exchanging structure 504 substantially in contact with the liquid water 508.

Moreover, a second signal can also be outputted when the liquid level sensor 536 detects that the liquid water 508 supplied to the shell 502 has reached a predetermined second level higher than the first level. The second level may be a high level at which the heat exchanging structure 504 is substantially in contact with the liquid water 508 (e.g., after the coil-shaped portion 520A is entirely immersed). In some embodiments, the second level may also be set to leave a suitable gap 530 above the stored water 508. The second signal outputted by the liquid level sensor 536 can be used to electrically control closure of the valve 514 for stopping the supply of water.

Like previously described, the interior of the shell 502 can also include one or more heat conductor fins (not shown) extending along a depth of the shell 502 so as to be in substantial contact with the stored water 508.

The cooling apparatus 500 can be suitable for many industrial applications. Examples of suitable applications can include, without limitation, air conditioning systems for factory facilities, industrial cooling systems and the like.

Figure 7:
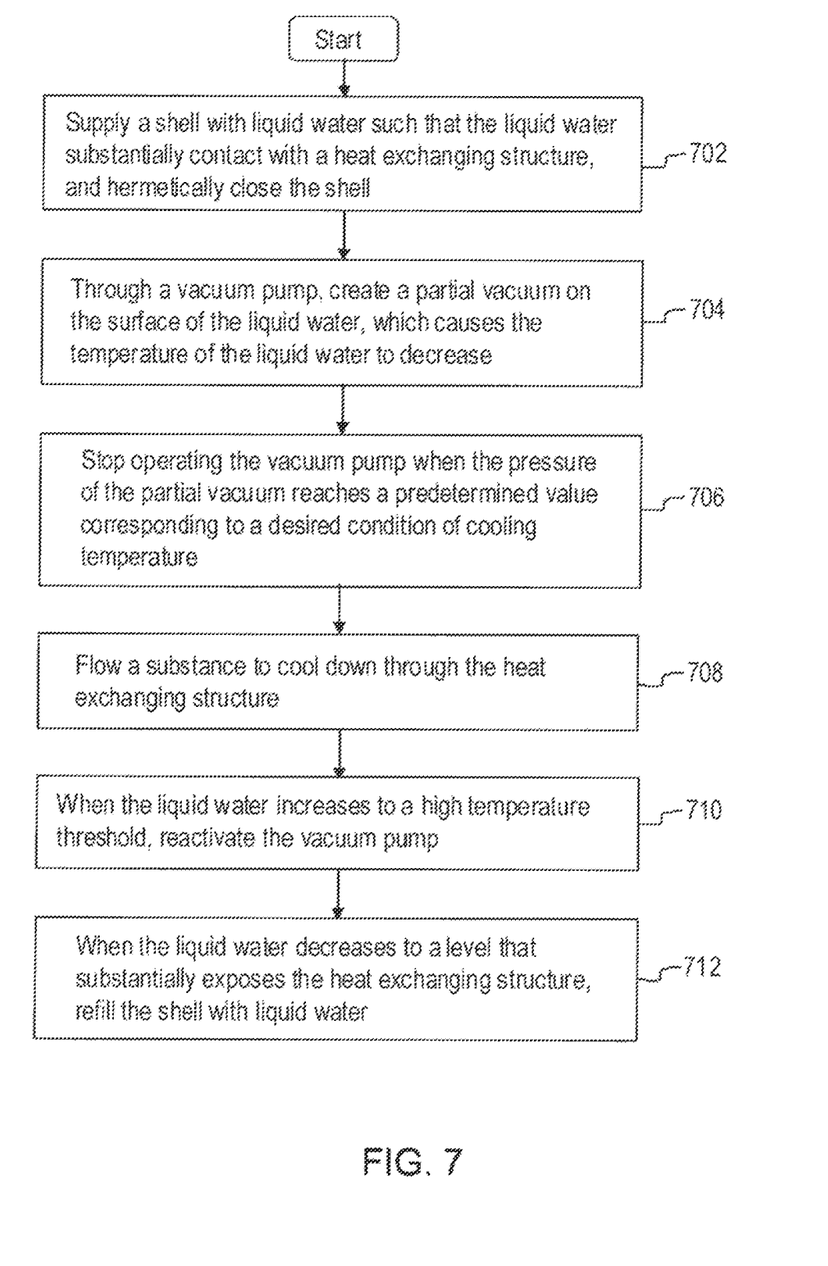
FIG. 7 is a flowchart of method steps of operating the cooling apparatus shown in FIG. 5.

In conjunction with FIGS. 5 and 6, FIG. 7 is a flowchart of method steps of operating the cooling apparatus 500. In initial step 702, the valve 514 can be opened, and liquid water can be supplied through the water inlet 510 into the shell 502. The liquid water 508 can be plain water, salted water, and the like. Once the liquid water 508 has reached a desired amount, the valve 514 can be closed to hermetically confine the liquid water 508 at rest in the shell 502. Preferably, the amount of liquid water 508 should be such that the heat exchanging structure 504 (in particular the coil-shaped portion 520A of the pipe circuit 520) is substantially immersed in the liquid water 508, while a gap 530 is left above the water surface.

In step 704, a partial vacuum can be created above the water surface by activating the vacuum pump 506 to draw gas molecules (e.g., air at the beginning) outside the sealed gap 530 above the surface of the liquid water 508. As the pressure acting on the water surface abruptly drops, the rate of evaporation of the liquid water 508 can promptly increase. As a result, latent heat of vaporization is taken in, and the temperature of the liquid water 508 can rapidly decrease.

In step 706, once the decreasing pressure in the sealed gap 530 reaches a predetermined low pressure value corresponding to a desired condition of cooling temperature, the vacuum pump 506 can stop operating. In one embodiment, the pressure of the partial vacuum generated by the vacuum pump 506 may be controlled to cause a temperature drop of the liquid water 508 to near a freezing point (e.g., near 0 degrees Celsius for plain water, or lower for salted water). However, the pressure of the partial vacuum may also be changed for other desirable cooling temperatures. The pressure in the sealed gap 530 at which the vacuum pump 506 can be stopped can be exemplary in the range between about 3 and about 5 torrs.

In step 708, the flow pump 522 can be activated to flow the substance 521 through the heat exchanging structure 504. The cooling action produced by the chilled liquid water 508 then can be transferred through the heat exchanging structure 504 to the substance 521.

As the cooling apparatus 500 is used over a period of time, the temperature of the liquid water 508 may gradually increase, and a portion of the liquid water 508 may be converted to vapor in the sealed gap 530. When the increasing temperature of the liquid water 508 reaches a certain high temperature threshold, the vacuum pump 506 in step 710 can be reactivated such that the liquid water 508 can undergo a new cooling cycle.

As the liquid water 508 progressively evaporates and decreases to a low level that substantially exposes the heat exchanging structure 504 above the water surface, additional supply of liquid water may be performed in step 712. For this purpose, the venting valve 531 can be opened to release the partial vacuum in the gap 530, the valve 514 can opened, and liquid water then can be introduced through the water inlet 510 into the shell 502. Subsequently, steps 704 and 706 can be repeated to cool down the liquid water 508.

At least one advantage of the apparatuses and methods described herein is the ability to produce cooling action from water at an economical cost.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A cooling apparatus comprising:
a shell having an interior hermetically storing water in a liquid form, and a port communicating with the interior of the shell and located above a surface of the water stored in the shell;
a heat exchanging structure adapted to receive a substance to cool down, the heat exchanging structure being a chamber that is formed as a recessed region in the shell and is accessible from outside the shell for placement of the substance to cool down, the heat exchanging structure having one or more heat transfer walls, each of the heat transfer walls has a first surface in contact with the water stored in the shell and a second surface for contacting with the substance to cool down, and the chamber being mounted with a lid operable to upwardly close and open the chamber, the lid when opened exposing an interior of the chamber while the water remains hermetically sealed in the shell; and
a vacuum pump connected with the port, the vacuum pump being activated to create a partial vacuum on the surface of the water in the liquid form, which causes a decrease in temperature of the water stored in the shell to a desirable cooling temperature, the water at the desirable cooling temperature thereby acting as a coolant for the substance received in the heat exchanging structure.

2. The cooling apparatus according to claim 1, wherein the heat exchanging structure is made of a metallic material.

3. The cooling apparatus according to claim 1, wherein the shell has an outer sidewall at least partially covered with a heat insulating material.

4. The cooling apparatus according to claim 1, further including a temperature sensor configured to measure a temperature in the shell.

5. The cooling apparatus according to claim 4, wherein the vacuum pump is activated when the temperature read by the temperature sensor has a value higher than a predetermined temperature.

6. The cooling apparatus according to claim 1, wherein the partial vacuum has a pressure between 3 and 5 torrs.

7. The cooling apparatus according to claim 1, wherein the vacuum pump operates to create a partial vacuum on the surface of the water that results in a decrease of the temperature of the water to near a freezing point.

8. The cooling apparatus according to claim 1, further including a liquid level sensor operable to measure a height of the water stored in the shell.

9. The cooling apparatus according to claim 8, wherein the liquid level sensor outputs a signal when the water decreases to a level that substantially exposes the heat exchanging structure above the surface of the water.

10. The cooling apparatus according to claim 1, wherein the shell includes a water inlet, and a sealing element configured to hermetically close and open the water inlet.

11. The cooling apparatus according to claim 10, wherein the shell further includes a water outlet, and another sealing element configured to hermetically close and open the water outlet, the water outlet being disposed at a lower side of the shell, and the water inlet being disposed on an upper side of the shell.

12. The cooling apparatus according to claim 1, wherein an interior of the shell further includes a plurality of heat conductor fins, each of the heat conductor fins extending from the surface of the water along a depth direction for contacting with the water stored in the shell.

13. The cooling apparatus according to claim 1, wherein the heat transfer walls include a bottom floor of the chamber, and a plurality of lateral sidewalls extending upward from the bottom floor.

14. The cooling apparatus according to claim 1, wherein the shell has a water storage region that surrounds the chamber.

15. The cooling apparatus according to claim 1, wherein the water includes plain water, or salted water.

16. A method of cooling a substance, comprising: hermetically confining water in a liquid form in a shell, so that the water is in contact with a heat exchanging structure, the heat exchanging structure including a chamber that is accessible from outside the shell, and the shell having a port located above the confining water; placing a substance to cool down in an interior of the chamber that is opened to an outside environment; the chamber being mounted with a lid operable to upwardly close and open the chamber, the lid when opened exposing an interior of the chamber while the water remains hermetically sealed in the shell; and through the port creating partial vacuum in an inner space of the shell that is confined and hermetically sealed above the water in the liquid form, thereby causing a decrease in temperature of the water to a desirable cooling temperature to cool down the substance placed in the chamber.

17. The method according to claim 16, wherein the partial vacuum has a pressure between 3 and 5 torrs.

* * * * *